US012059938B2

(12) United States Patent
Nalawade et al.

(10) Patent No.: US 12,059,938 B2
(45) Date of Patent: Aug. 13, 2024

(54) VEHICLE SUSPENSION SYSTEM

(71) Applicant: Volvo Truck Corporation, Gothenburg (SE)

(72) Inventors: Dinkar Nalawade, Karnataka (IN); Mehul Shah, Indore (IN); Anish Sivankutty, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/494,895

(22) Filed: Oct. 26, 2023

(65) Prior Publication Data

US 2024/0149630 A1 May 9, 2024

(30) Foreign Application Priority Data

Nov. 3, 2022 (EP) .................................. 22205407

(51) Int. Cl.
*B60G 17/02* (2006.01)
*B60G 11/113* (2006.01)
*B60G 17/019* (2006.01)

(52) U.S. Cl.
CPC .......... *B60G 17/019* (2013.01); *B60G 11/113* (2013.01); *B60G 2202/11* (2013.01); *B60G 2400/94* (2013.01)

(58) Field of Classification Search
CPC . B60G 17/019; B60G 11/113; B60G 2202/11; B60G 2400/94; B60G 17/02; B60G 17/023
USPC ...................... 280/124.163, 124.17, 124.174
See application file for complete search history.

(56) References Cited

U.S. PATENT DOCUMENTS

| 5,912,439 | A | * | 6/1999 | Eran | ..................... | B60G 17/019 |
| | | | | | | 177/136 |
| 11,148,498 | B2 | * | 10/2021 | Larsson | ............. | B60G 17/0195 |
| 2003/0025288 | A1 | * | 2/2003 | Petit | ................... | B60G 17/0521 |
| | | | | | | 280/124.157 |
| 2008/0121438 | A1 | | 5/2008 | Brown | | |

(Continued)

FOREIGN PATENT DOCUMENTS

DE 102018123082 A1 3/2020
JP 2012131406 A 7/2012

(Continued)

OTHER PUBLICATIONS

Extended European Search Report for European Patent Application No. 22205407.4, mailed Mar. 30, 2023, 7 pages.

*Primary Examiner* — Toan C To
(74) *Attorney, Agent, or Firm* — Withrow & Terranova, PLLC

(57) ABSTRACT

A vehicle comprising a first leaf spring connected to a chassis so as to, while deflecting, allow relative vertical movement between the chassis and a wheel axle and thereby also between the chassis and wheels, and a control circuitry configured to: compare the signal indicative of the actual path followed by the wind-up center with a representation of a reference path that the wind-up center of the first leaf spring should follow when the first leaf spring is well-functioning and deflects as intended; determine whether a difference between the actual path and the reference path is greater than a threshold value; and, in response to the determined difference greater than the threshold, generate an alarm signal indicative of a detected or possibly detected leaf spring failure.

15 Claims, 4 Drawing Sheets

(56) References Cited

U.S. PATENT DOCUMENTS

2012/0200057 A1\* 8/2012 Juriga .................... B60G 11/06
                                                    280/124.116
2019/0359022 A1\* 11/2019 Patel ...................... B60G 11/10
2024/0153322 A1\* 5/2024 Nalawade ............ G07C 5/0816

FOREIGN PATENT DOCUMENTS

KR      20190073024 A    6/2019
WO       2013095206 A1    6/2013

\* cited by examiner

VEHICLE SUSPENSION SYSTEM

RELATED APPLICATIONS

The present application claims priority to European Patent Application No. 22205407.4, filed on Nov. 3, 2022, and entitled "VEHICLE SUSPENSION SYSTEM," which is incorporated herein by reference in its entirety.

TECHNICAL FIELD

The disclosure relates to a vehicle comprising a suspension system provided with leaf springs. In particular the disclosure relates to detection of leaf spring failure. The disclosure can be applied in heavy-duty vehicles, such as trucks, buses, and construction equipment. Although the disclosure may be described with respect to a particular vehicle, the disclosure is not restricted to any particular vehicle.

BACKGROUND

A vehicle suspension system connects wheels/axles with a chassis/body of the vehicle and typically includes springs, shock absorbers and linkages of various types. Leaf springs are commonly used in suspension systems for heavy vehicles, such as trucks, mining dumpers and similar. Failure or break down of a leaf spring, for instance due to fatigue stress after months of driving on rough road surfaces, can have rather severe consequences since it may lead to damage of remaining leaf springs, disconnection of axle and chassis, lost vehicle control for a driver of the vehicle, etc., which in turn may lead to accidents or at least is likely to lead to time-consuming and costly repair work.

Consequences of leaf spring failure can be reduced by stopping or at least reducing the speed of a vehicle subject to leaf spring failure. However, it is often difficult to detect a leaf spring failure; a driver may not sense any unbalanced vehicle behaviour or similar during operation of the vehicle, and in e.g. dusty, dark, and noisy environments where the vehicle is more or less constantly in operation it may even be difficult to detect a leaf spring failure by inspection when the vehicle stands still, which it does only during short time periods.

There is thus a need for improvements with regard to detecting a leaf spring failure.

SUMMARY

According to a first aspect of the disclosure, it concerns a vehicle comprising a chassis, a pair of left and right wheels and a suspension system for connecting the wheels and the chassis, wherein the suspension system comprises:
- a wheel axle that extends transversely across the vehicle and that is connected at the end portions thereof to the left and right wheels;
- a first leaf spring connected to the wheel axle in association with a corresponding wheel, wherein the first leaf spring is connected also to the chassis so as to, while deflecting, allow relative vertical movement between the chassis and the wheel axle and thereby also between the chassis and the wheels, wherein the first leaf spring extends in a longitudinal direction of the vehicle and is connected to the chassis via a moveable connection configured to allow a wind-up center of the first leaf spring to move in the longitudinal direction when the first leaf spring deflects;
- an inertial measurement unit arranged at the wind-up center of the first leaf spring, wherein the inertial measurement unit is adapted to provide a signal indicative of an actual path followed by the wind-up center of the first leaf spring when the first leaf spring deflects; wherein the vehicle further comprises:
- a control circuitry configured to control the suspension system, wherein e control circuitry is configured to:
- compare the signal indicative of the actual path followed by the wind-up center with a representation of a reference path that the wind-up center of the first leaf spring should follow when the first leaf spring is well-functioning and deflects as intended;
- determine whether a difference between the actual path and the reference path is greater than a threshold value and, if the determined difference is greater than the threshold,
- generate an alarm signal indicative of a detected or possibly detected leaf spring failure.

A leaf spring has a bent shape and deflects by straightening out when subject to a load. When arranged in a vehicle the leaf spring is somewhat straightened out because of the weight of the vehicle so the leaf spring can normally deflect in both directions. The leaf spring deflects around its wind-up center, i.e., the rotational center of the leaf spring.

The first leaf spring may be arranged according to a conventional design with the wind-up center arranged at the wheel axle, with one end fixed to the chassis and the other end connected to the chassis via a pivoted shackle allowing a longitudinal movement of the leaf spring (and of the wheel axle) when the leaf spring is compressed, straightened out and extended when the corresponding wheel passes a significant bump on a road surface while driving the vehicle (or allowing a longitudinal movement in the opposite direction when the wheel passes a pot hole and the leaf spring deflects in the opposite direction, i.e. when it is relaxed, further bent and thus assumes a shorter length in the longitudinal direction).

The wind-up center of a well-functioning leaf spring that deflects as intended will follow a given path having the shape of a circular arc (because the wind-up center moves both longitudinally and vertically). The circle corresponding to this arc path is sometimes denoted Ross circle. This given path along the circular arc forms the reference path.

The actual path followed by the wind-up center is registered by the inertial measurement unit (IMU). If the leaf spring is damaged and does not deflect as intended, the wind-up center will not follow the reference path. The control circuitry compares the actual path and the reference path, and if the difference is greater than allowed, an alarm signal is generated.

The comparison of the actual path and the reference path can be done in different ways. One example is to compare the position data for the two paths. Another example is to determine an actual center point of the circle corresponding to the actual path and compare the position of the actual center point with a reference center point of the circle corresponding to the reference path. The alarm signal may then be generated if the distance between the actual and reference center points is greater than a threshold distance. These circle center points are sometimes denoted Ross points.

A leaf spring level sensor may be used to measure (preferably under unladen weight conditions) the vertical position of the leaf spring and thus of the IMU, which in turn can be used to calibrate the position of the IMU to obtain more accurate position measurements. Re-calibration may be made at certain intervals, and may in particular be made if the leaf spring is replaced.

The generation of the alarm signal may include providing a light-alarm indication on an instrument panel or in other ways making sure that a driver of the vehicle becomes aware of a potential leaf spring problem so the driver can stop or slow down the vehicle. It may also include automatic measures, such as checking the speed of the vehicle and reduce the speed by applying a braking system if the speed is greater than a certain threshold speed. For both autonomous and manually operated vehicles the generation of the alarm signal may include automatically reducing the speed, possibly followed by automatically stopping the vehicle.

The control circuitry may form part of or be connected to a vehicle control system configured to control other components of the vehicle, such as driveline and braking system.

A general advantageous effect of a suspension system of the above type is that an early warning is provided regarding a damaged or at least possibly damaged leaf spring. It then becomes possible to immediately slow down and stop the vehicle so as to prevent loss of control of the vehicle and prevent damage of other leaf springs on the vehicle. In turn this provides for a reduced risk for accidents and reduced costs for repair work and shortened down time/service time.

A leaf spring failure detection system of the above type may be activated more or less continuously as long as the vehicle is activated. A leaf spring failure can thereby be detected immediately.

What value to set for the difference threshold depends on e.g., the type and size of the vehicle and the particular design of the suspension system.

In an example, the control circuitry is configured to:
determine an actual center point of a circle corresponding to the actual path;
compare the position of the actual center point with a reference center point of a circle corresponding to the reference path; and
determine whether a distance between the actual center point and the reference center points is greater than a threshold distance.

In an example, the inertial measurement unit comprises an accelerometer, a gyroscope and/or a magnetometer.

In an example, the suspension system comprises a level sensor arranged to provide a signal indicative of a current vertical position of the first leaf spring in relation to the chassis.

In an example, the control circuitry is configured to calibrate the reference path based on the signal obtained from the level sensor.

In an example, the suspension system further comprises a shock absorber arranged to be compressed when the vertical distance between the chassis and the wheel axle decreases, wherein the level sensor is integrated in the shock absorber.

In an example, the level sensor is an eddy current based linear position sensor.

In an example, the first leaf spring is connected to the chassis at a first point in front of the corresponding wheel and at a second point behind the corresponding wheel with reference to a front and rear of the vehicle.

In an example, the suspension system comprises a second leaf spring connected to the wheel axle in association with a corresponding wheel on an opposite side of the vehicle in relation to the first leaf spring. Preferably, a further inertial measurement unit is arranged at the second leaf spring in a similar way as at the first leaf spring and, preferably, the control circuitry is arranged detect leaf spring failure in a similar way also with regard to the second leaf spring.

In an example, the control circuitry forms part of or is connected to a vehicle control system configured to control a speed of the vehicle, wherein the vehicle control system is configured to reduce the speed of the vehicle and/or stop the vehicle as a response to the leaf spring failure alarm signal.

In an example, the vehicle is a heavy commercial vehicle, such as a mining dumper, truck or articulated hauler.

According to a second aspect of the disclosure, it concerns a method for operating a vehicle according to above, the method comprising:
comparing the signal indicative of the actual path followed by the wind-up center with a representation of a reference path that the wind-up center of the first leaf spring should follow when the first leaf spring is well-functioning and deflects as intended;
determining whether a difference between the actual path and the reference path is greater than a threshold value; and, if the determined difference is greater than the threshold,
generating an alarm signal indicative of a detected or possibly detected leaf spring failure.

In an example, the method further comprises:
determining an actual center point of a circle corresponding to the actual path;
comparing the position of the actual center point with a reference center point of a circle corresponding to the reference path; and
determining whether a distance between the actual center point and the reference center points is greater than a threshold distance.

In an example, the method further comprises:
calibrating the reference path based on the signal obtained from a level sensor arranged to provide a signal indicative of a current vertical position of the first leaf spring in relation to the chassis.

According to a third aspect of the disclosure, it concerns a control circuitry for controlling a vehicle according to above, the control circuitry being configured to perform the method according to above.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
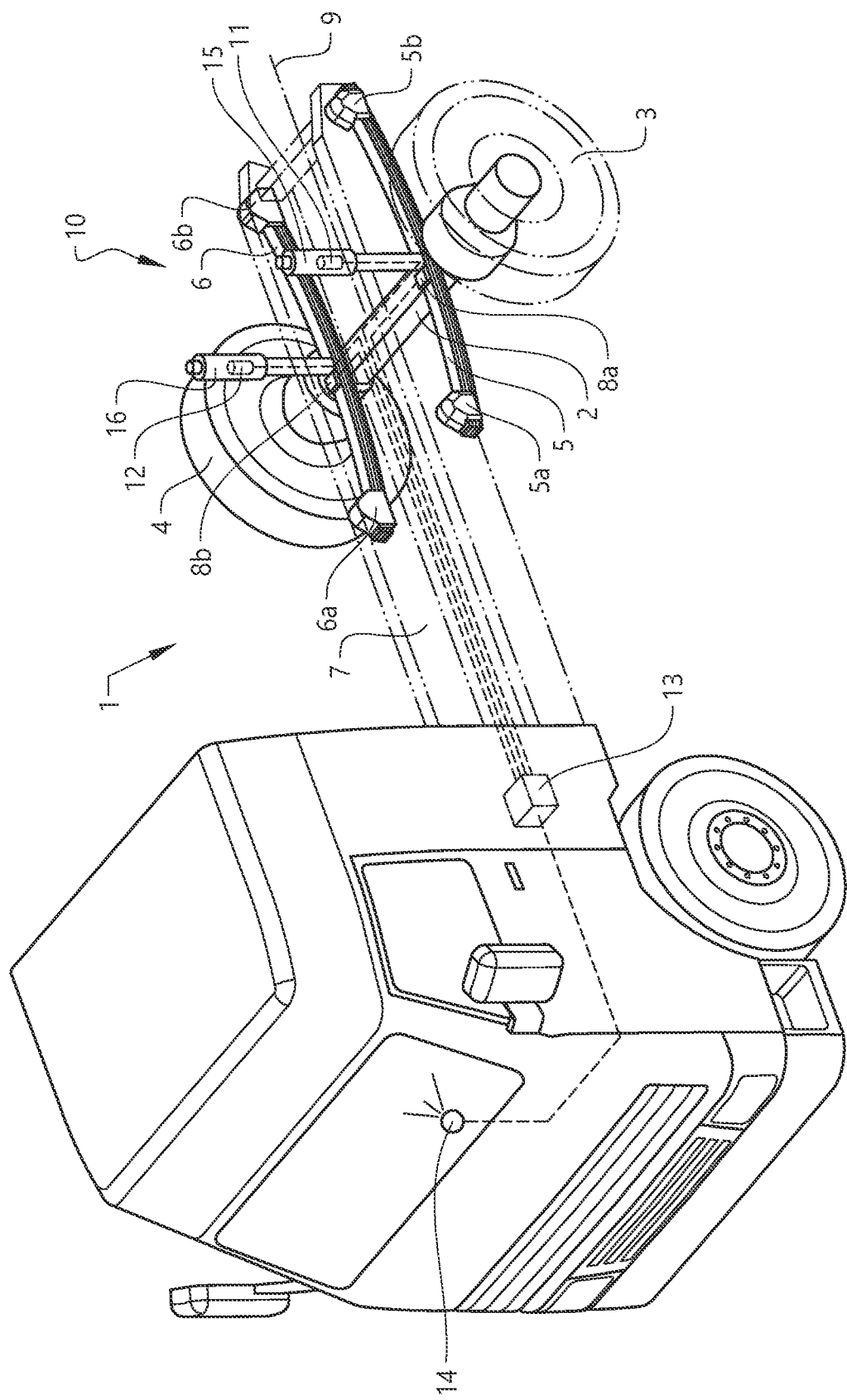
FIG. 1 shows a schematic example of a vehicle provided with a suspension system according to this disclosure.

FIG. 1 shows a vehicle 1 comprising a chassis 7, a pair of left and right (rear) wheels 3, 4 and a suspension system 10 for connecting the wheels 3, 4 and the chassis 7. A wheel axle 2 extends transversely across the vehicle 1 and is connected at the end portions thereof to the left and right wheels 3, 4. A first (right) leaf spring 6 is connected to the wheel axle 2 in association with a corresponding (right) wheel 4. The first leaf spring 6 is connected also to the chassis 7 so as to, while deflecting, allow relative vertical movement between the chassis 7 and the wheel axle 2 and thereby also between the chassis 7 and the wheels 3, 4. The first leaf spring 6 extends in a longitudinal direction of the vehicle 7 and is connected to the chassis 7 via a moveable connection 6b that includes a shackle 6c (see FIG. 2) so as to allow a wind-up center 20 of the first leaf spring 6 to move in the longitudinal direction when the first leaf spring 6 deflects. The first leaf spring 6 is connected to the chassis 7 at a first point 6a in front of the corresponding wheel and at a second point, i.e., the movable connection 6b, behind the corresponding wheel 4 with reference to a front and rear of the vehicle 1.

An inertial measurement unit 8b (IMU) is arranged at the wind-up center 20 of the first leaf spring 6. The IMU 8b comprises an accelerometer, a gyroscope and/or a magnetometer and is thus adapted to provide a signal indicative of an actual path 30 (see FIG. 3) followed by the wind-up center 20 of the first leaf spring 6 when the first leaf spring 6 deflects.

The suspension system 10 comprises a level sensor 12 arranged to provide a signal indicative of a current vertical position of the first leaf spring 6 in relation to the chassis 7. The level sensor 12 is integrated in a shock absorber 16 arranged to be compressed when the vertical distance between the chassis 7 and the wheel axle 2 decreases. The level sensor 12 may be an eddy current based linear position sensor.

The suspension system 10 also includes a similar arrangement on the left side of the vehicle 1 including a second (left) leaf spring 5 attached at points 5a and 5b to the chassis 7, a further IMU 8a, a further shock absorber 15 provided with a further level sensor 11.

The vehicle 1 further comprises a control circuitry 13 configured to control the suspension system 10, including receiving signals from the IMUs 8a, 8b and the level sensors 11, 12. In this example the control circuitry 13 forms part of a vehicle control system configured to control, for instance, a speed of the vehicle 1. In particular, the vehicle control system is configured to reduce the speed of the vehicle 1 and/or stop the vehicle 1 as a response to a leaf spring failure alarm signal as will be described below. The control circuit 13, and/or the vehicle control system, may also or alternatively be configured to activate an alarm light 14 on the driver instrument panel, or activate some other alarm, when detecting a leaf spring failure.

Figure 2:
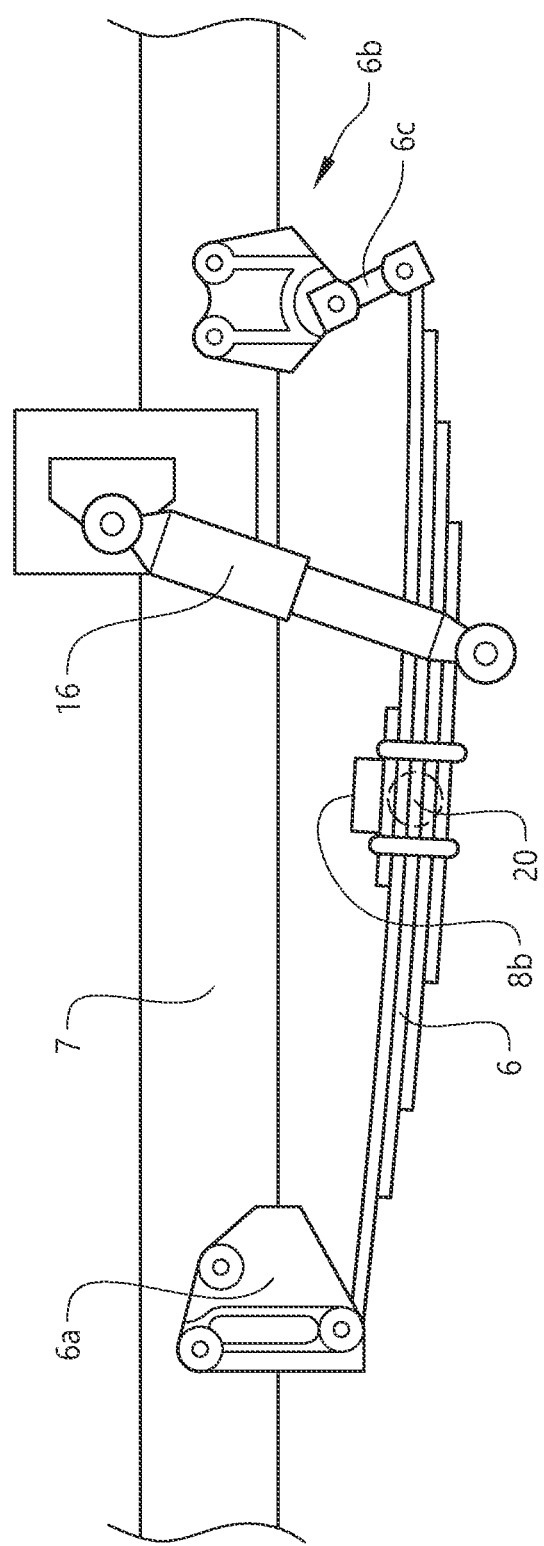
FIG. 2 shows a side view of one of the leaf springs shown in FIG. 1.

FIG. 2 shows a side view of the first leaf spring 1 shown in FIG. 1. FIG. 2 shows for instance that the IMU 8b is located at the wind-up center 20 of the first leaf spring 6 and that the second connection point 6b includes a shackle 6c.

Figure 3:
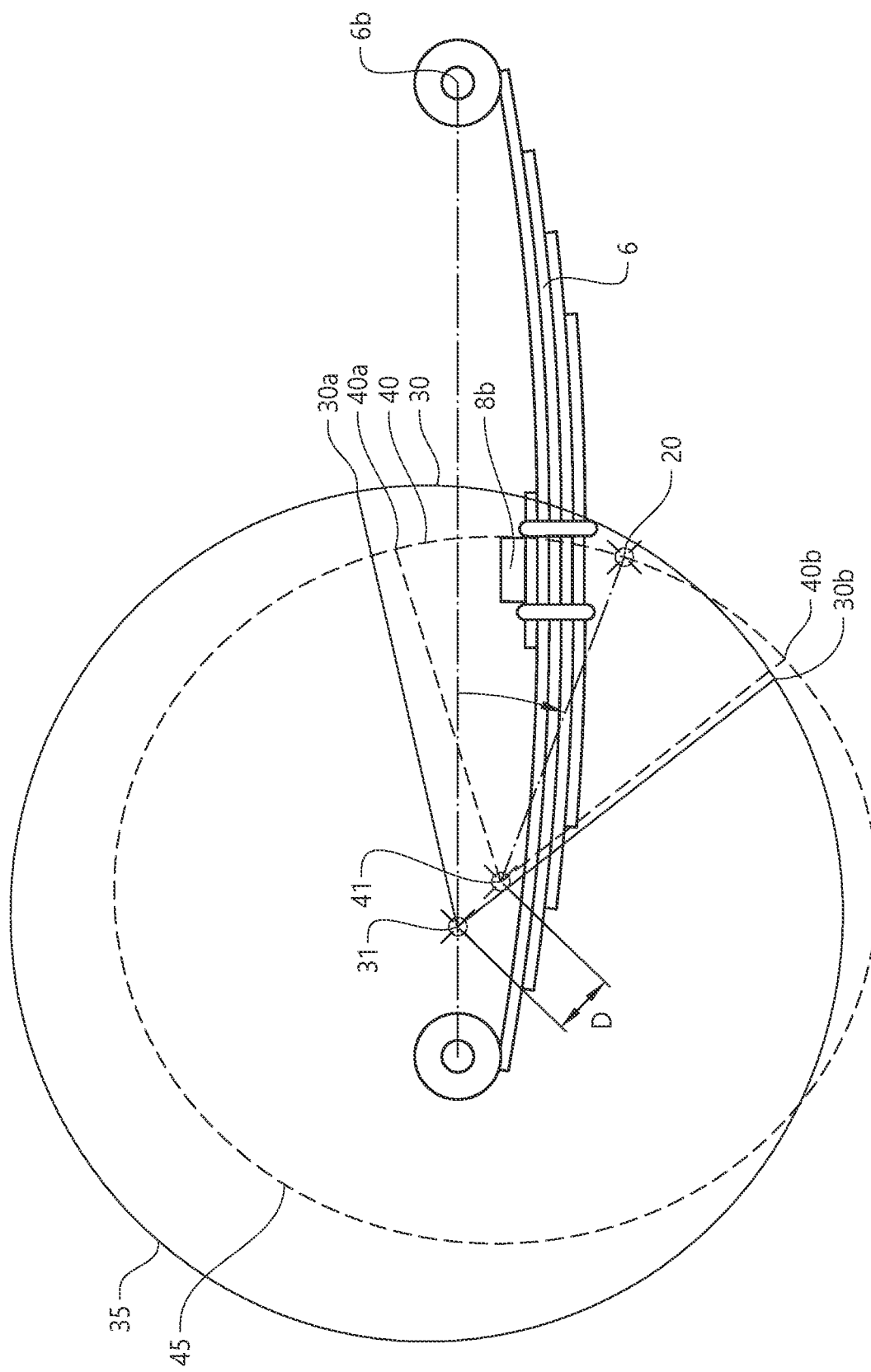
FIG. 3 shows the principal movement of a wind-up center of the leaf spring of FIG. 2 when the leaf spring deflects.

FIG. 3 shows the principal movement of the wind-up center 20 of the first leaf spring 6 when the leaf spring deflects. When the leaf spring 6 is compressed and straightened out (because the chassis 7 presses the end parts of the leaf spring downwards while the wheel axle 2 presses a central part of the leaf spring upwards), the wind-up center 20 moves upwards and also towards the right in FIG. 3 leading to a movement along a path resembling a circular arc. If the leaf spring 6 is well-functioning and deflects as intended, the wind-up center 20 will follow a reference path that extends along a circular arc between points 40A and 40B corresponding to dashed circle 45. If the leaf spring 6 is damaged it will not deflect as intended and the wind-up center 20 will follow an actual path 30 that does not coincide with the reference path 40. The IMU 8b is capable of providing a signal indicative of the actual path 30 followed by the wind-up center 20. FIG. 3 indicates an actual path 30 of the wind-up center 20 when the leaf spring 6 is damaged. The actual path 30 follows a circle arc somewhere between points 30A and 30B corresponding to solid line circle 35. A center point 41 of the reference circle 45 is located at a distance D from a center point 31 of the "actual" circle 35, i.e., the circle corresponding to the circle arc 30A-30B. These circles may be denoted Ross circles and the circle center points may be denoted Ross points.

The control circuitry 13 is configured to:
  compare the signal indicative of the actual path 30 followed by the wind-up center 20 with a representation of the reference path 40 that the wind-up center 20 of the first leaf spring 6 should follow when the first leaf spring 6 is well-functioning and deflects as intended;
  determine whether a difference between the actual path 30 and the reference path 40 is greater than a threshold value;
and, if the determined difference is greater than the threshold,
  generate an alarm signal indicative of a detected or possibly detected leaf spring failure.

The control circuitry 13 is in this example further configured to:
  determine the actual center point 31 of a circle 35 corresponding to the actual path 30;
  compare the position of the actual center point 31 with the reference center point 41 of the circle corresponding to the reference path 40; and
  determine whether the distance D between the actual center point 31 and the reference center point 41 is greater than a threshold distance.

And if so, the alarm signal is generated.

The control circuitry 13 is in this example further configured to:
  calibrate the reference path 40 based on the signal obtained from the level sensor 12.

An alarm signal can be generated in a similar way if the other (left) leaf spring 5 is damaged (using a signal from the other IMU 8a and the same or another reference path to compare with).

Figure 4:
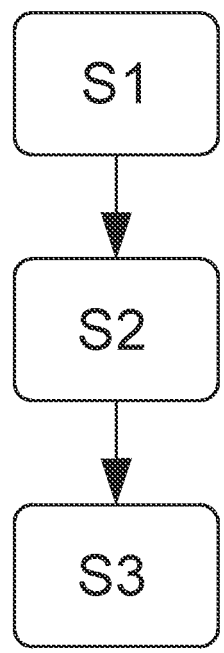
FIG. 4 shows a flow diagram for an example of a method according to this disclosure.

FIG. 4 shows a flow diagram for an example of a method for operating the vehicle 1, the method comprising:
  S1: comparing the signal indicative of the actual path 30 followed by the wind-up center 20 with a representation of the reference path 40 that the wind-up center 20 of the first leaf spring 6 should follow when the first leaf spring 6 is well-functioning and deflects as intended;

S2: determining whether a difference between the actual path 30 and the reference path 40 is greater than a threshold value;

and, if the determined difference is greater than the threshold,

S3: generating an alarm signal indicative of a detected or possibly detected leaf spring failure.

The step S2 may further comprise:

S21: determining the actual center point 31 of the circle 35 corresponding to the actual path 30;

S22: comparing the position of the actual center point 31 with the reference center point 41 of the circle 45 corresponding to the reference path 40; and S23: determining whether the distance D between the actual center point 31 and the reference center point 41 is greater than a threshold distance.

And if so, the alarm signal is generated.

The method may further include:

S4: checking a speed of the vehicle 1; and

S5: reducing the speed of the vehicle 1 by applying a vehicle braking system if the speed is greater than a certain threshold speed.

The method may further include: S6: calibrating the reference path 40 based on the signal obtained from a level sensor 12 arranged to provide a signal indicative of a current vertical position of the first leaf spring 6 in relation to the chassis 7.

Figure 5:
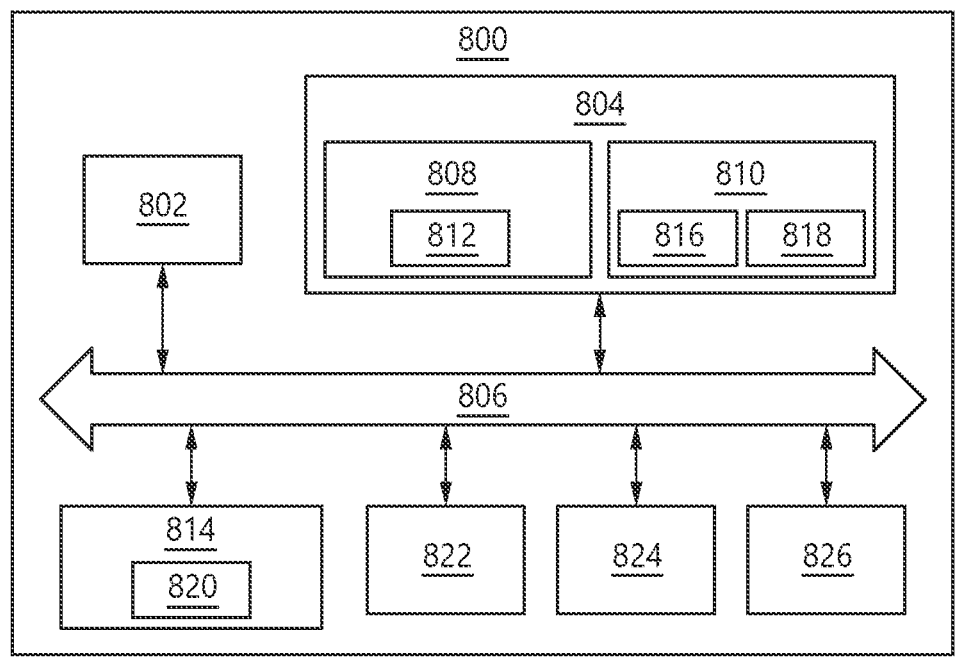
FIG. 5 is a schematic diagram of an exemplary computer system for implementing examples disclosed herein, according to one example.

FIG. 5 is a schematic diagram of a computer system 800 for implementing examples disclosed herein. The computer system 800 is adapted to execute instructions from a computer-readable medium to perform these and/or any of the functions or processing described herein. The computer system 800 may be connected (e.g., networked) to other machines in a LAN, an intranet, an extranet, or the Internet. While only a single device is illustrated, the computer system 800 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, a control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 800 may comprise at least one computing device or electronic device capable of including firmware, hardware, and/or executing software instructions to implement the functionality described herein. The computer system 800 may include a processor device 802 (may also be referred to as a control unit or the control circuitry 13), a memory 804, and a system bus 806. The computer system 800 may include at least one computing device having the processor device 802. The system bus 806 provides an interface for system components including, but not limited to, the memory 804 and the processor device 802. The processor device 802 may include any number of hardware components for conducting data or signal processing or for executing computer code stored in memory 804.

The processor device 802 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the processor device 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with a processor device 802. A basic input/output system (BIOS) 812 may be stored in the non-volatile memory 808 and can include the basic routines that help to transfer information between elements within the computer system 800.

The computer system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 814 and/or in the volatile memory 810, which may include an operating system 816 and/or one or more program modules 818. All or a portion of the examples disclosed herein may be implemented as a computer program product 820 stored on a transitory or non-transitory computer-usable or computer-readable storage medium (e.g., single medium or multiple media), such as the storage device 814, which includes complex programming instructions (e.g., complex computer-readable program code) to cause the processor device 802 to carry out the steps described herein. Thus, the computer-readable program code can comprise software instructions for implementing the functionality of the examples described herein when executed by the processor device 802. The processor device 802 may serve as a controller or control system for the computer system 800 that is to implement the functionality described herein.

The computer system 800 also may include an input device interface 822 (e.g., input device interface and/or output device interface). The input device interface 822 may be configured to receive input and selections to be communicated to the computer system 800 when executing instructions, such as from a keyboard, mouse, touch-sensitive surface, the sensors 8a, 8b, 11, 12, etc. Such input devices may be connected to the processor device 802 through the input device interface 822 coupled to the system bus 806 but can be connected through other interfaces such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computer system 800 may also include a communications interface 826 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

Further aspects of this disclosure include the following points:

1. A computer system comprising a processor device configured to:
   compare the signal (or message or information) indicative of the actual path (30) followed by the wind-up center (20) with a representation of a reference path (40) that the wind-up center (20) of the first leaf spring (6) should follow when the first leaf spring (6) is well-functioning and deflects as intended;
   determine whether a difference between the actual path (30) and the reference path (40) is greater than a threshold value;
   and, if the determined difference is greater than the threshold,
   generate an alarm signal (or message or information) indicative of a detected or possibly detected leaf spring failure.

2. The system of point 1, wherein the processing device is further configured to:
   determine an actual center point (31) of a circle (35) corresponding to the actual path (30);
   compare the position of the actual center point (31) with a reference center point (41) of a circle (45) corresponding to the reference path (40); and
   determine whether a distance (D) between the actual center point (31) and the reference center point (41) is greater than a threshold distance.

3. A computer-implemented method, comprising:
   (S1) comparing, by a processor device of a computer system, the signal (or message or information) indicative of the actual path (30) followed by the wind-up center (20) with a representation of a reference path (40) that the wind-up center (20) of the first leaf spring (6) should follow when the first leaf spring (6) is well-functioning and deflects as intended;
   (S2) determining, by the processor device, whether a difference between the actual path (30) and the reference path (40) is greater than a threshold value;
   and, if the determined difference is greater than the threshold,
   (S3) generating, by the processor device, an alarm signal (or message or information) indicative of a detected or possibly detected leaf spring failure.

4. The method of point 3, further comprising:
determining an actual center point (31) of a circle (35) corresponding to the actual path (30);
comparing the position of the actual center point (31) with a reference center point (41) of a circle (45) corresponding to the reference path (40); and
determining whether a distance (D) between the actual center point (31) and the reference center point (41) is greater than a threshold distance.

5. The method of point 3, further comprising:
(S4): checking, by the processor device, the speed of the vehicle, and
(S5): reducing the speed of the vehicle 1 by applying, by the processor device, a vehicle braking system if the speed is greater than a certain threshold speed.

6. A vehicle comprising the processor device to perform the method of point 3.

7. A computer program product comprising program code for performing, when executed by the processor device, the method of point 3.

8. A control system comprising one or more control units configured to perform the method of point 3.

9. A non-transitory computer-readable storage medium comprising instructions, which when executed by the processor device, cause the processor device to perform the method of point 3.

The invention claimed is:

1. A vehicle comprising a chassis, a pair of left and right wheels, and a suspension system for connecting the wheels and the chassis, wherein the suspension system comprises:
a wheel axle that extends transversely across the vehicle and that is connected at the end portions thereof to the left and right wheels;
a first leaf spring connected to the wheel axle in association with a corresponding wheel, wherein the first leaf spring is connected also to the chassis so as to, while deflecting, allow relative vertical movement between the chassis and the wheel axle and thereby also between the chassis and the wheels, wherein the first leaf spring extends in a longitudinal direction of the vehicle and is connected to the chassis via a moveable connection configured to allow a wind-up center of the first leaf spring to move in the longitudinal direction when the first leaf spring deflects; and
an inertial measurement unit arranged at the wind-up center of the first leaf spring, wherein the inertial measurement unit is adapted to provide a signal indicative of an actual path followed by the wind-up center of the first leaf spring when the first leaf spring deflects;
wherein the vehicle further comprises:
a control circuitry configured to control the suspension system, wherein the control circuitry is configured to:
compare the signal indicative of the actual path followed by the wind-up center with a representation of a reference path that the wind-up center of the first leaf spring should follow when the first leaf spring is well-functioning and deflects as intended;
determine whether a difference between the actual path and the reference path is greater than a threshold value; and
in response to the determined difference greater than the threshold, generate an alarm signal indicative of a detected or possibly detected leaf spring failure.

2. The vehicle of claim 1, wherein the control circuitry is configured to:
determine an actual center point of a circle corresponding to the actual path;
compare the position of the actual center point with a reference center point of a circle corresponding to the reference path; and
determine whether a distance between the actual center point and the reference center point is greater than a threshold distance.

3. The vehicle of claim 1, wherein the inertial measurement unit comprises an accelerometer, a gyroscope, and/or a magnetometer.

4. The vehicle of claim 1, wherein the suspension system comprises a level sensor arranged to provide a signal indicative of a current vertical position of the first leaf spring in relation to the chassis.

5. The vehicle of claim 4, wherein the control circuitry is configured to:
calibrate the reference path based on the signal obtained from the level sensor.

6. The vehicle of claim 4, wherein the suspension system further comprises a shock absorber arranged to be compressed when the vertical distance between the chassis and the wheel axle decreases, wherein the level sensor is integrated in the shock absorber.

7. The vehicle of claim 4, wherein the level sensor is an eddy current based linear position sensor.

8. The vehicle of claim 1, wherein the first leaf spring is connected to the chassis at a first point in front of the corresponding wheel and at a second point behind the corresponding wheel with reference to a front and rear of the vehicle.

9. The vehicle of claim 1, wherein the suspension system comprises a second leaf spring connected to the wheel axle in association with a corresponding wheel on an opposite side of the vehicle in relation to the first leaf spring.

10. The vehicle of claim 1, wherein the control circuitry forms part of or is connected to a vehicle control system configured to control a speed of the vehicle, wherein the vehicle control system is configured to reduce the speed of the vehicle and/or stop the vehicle as a response to the leaf spring failure alarm signal.

11. The vehicle of claim 1, wherein the vehicle is a heavy commercial vehicle, such as a mining dumper, truck, or articulated hauler.

12. A method for operating the vehicle of claim 1, the method comprising:
comparing the signal indicative; of the actual path followed by the wind-up center with a representation of a reference path that the wind-up center of the first leaf spring should follow when the first leaf spring is well-functioning and deflects as intended;
determining whether a difference between the actual path and the reference path is greater than a threshold value; and
in response to the determined difference greater than the threshold, generating an alarm signal indicative of a detected or possibly detected leaf spring failure.

13. The method of claim 12, further comprising:
determining an actual center point of a circle corresponding to the actual path;
comparing the position of the actual center point with a reference center point of a circle corresponding to the reference path; and
determining whether a distance between the actual center point and the reference center point is greater than a threshold distance.

14. The method of claim 12, further comprising:
calibrating the reference path based on the signal obtained from a level sensor arranged to provide a signal indicative of a current vertical position of the first leaf spring in relation to the chassis.

15. A control circuitry for controlling the vehicle of claim 1, the control circuitry configured to control the suspension system, wherein the control circuitry is further configured to:
compare the signal indicative of the actual path followed by the wind-up center with a representation of a reference path that the wind-up center of the first leaf spring should follow when the first leaf spring is well-functioning and deflects as intended;
determine whether a difference between the actual path and the reference path is greater than a threshold value; and
in response to the determined difference greater than the threshold, generate an alarm signal indicative of a detected or possibly detected leaf spring failure.

* * * * *